United States Patent
Bani Hani et al.

(10) Patent No.: US 9,521,508 B2
(45) Date of Patent: Dec. 13, 2016

(54) ARCHITECTURE AND METHOD TO 4G-MOBILE POSITIONING

(71) Applicant: BLACKBERRY LIMITED, Waterloo (CA)

(72) Inventors: Mohammad Shafiq Bani Hani, Niles, IL (US); Arnold Sheynman, Northbrook, IL (US); Bruce A. Bernhardt, Wauconda, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 23 days.

(21) Appl. No.: 13/921,636

(22) Filed: Jun. 19, 2013

(65) Prior Publication Data

US 2014/0378158 A1    Dec. 25, 2014

(51) Int. Cl.
*H04W 24/00* (2009.01)
*H04W 4/02* (2009.01)

(52) U.S. Cl.
CPC ..................................... *H04W 4/02* (2013.01)

(58) Field of Classification Search
None
See application file for complete search history.

(56) References Cited

U.S. PATENT DOCUMENTS

| | | | |
|---|---|---|---|
| 3,150,372 A | 9/1964 | Groth, Jr. | |
| 4,602,375 A | 7/1986 | Inukai | |
| 5,786,773 A | 7/1998 | Murphy | |
| 5,931,889 A | 8/1999 | Misra | |
| 6,085,090 A * | 7/2000 | Yee et al. | 455/440 |
| 6,101,178 A | 8/2000 | Beal | |
| 6,452,541 B1 | 9/2002 | Zhao et al. | |
| 6,480,787 B2 | 11/2002 | Yoshikawa et al. | |
| 6,509,870 B1 | 1/2003 | Matsushita et al. | |
| 6,564,064 B1 | 5/2003 | Ciganer et al. | |
| 6,597,988 B1 | 7/2003 | Brodie et al. | |
| 6,657,584 B2 | 12/2003 | Cavallaro et al. | |
| 6,744,406 B2 | 6/2004 | Kalafut et al. | |
| 6,771,625 B1 | 8/2004 | Beal | |
| 6,879,913 B1 | 4/2005 | Yu | |

(Continued)

FOREIGN PATENT DOCUMENTS

| | | |
|---|---|---|
| EP | 2200384 A1 | 6/2010 |
| EP | 2530488 A1 | 12/2012 |

(Continued)

OTHER PUBLICATIONS

Extended European Search Report; Application No. 13172820.6; Dec. 11, 2013; 4 pages.

(Continued)

*Primary Examiner* — Suhail Khan
(74) *Attorney, Agent, or Firm* — Conley Rose, P.C.; J. Robert Brown, Jr.

(57) ABSTRACT

A mobile device and a method and circuit for determining a position of the mobile device is disclosed. A positioning signal is received at a communication circuit of the mobile device. The received positioning signal is sent from the communication circuit to a position-determining module for determining the position of the mobile device from the positioning signal. A switch may be configured to selectively couple the position-determining module to the communication circuit.

21 Claims, 17 Drawing Sheets

(56) References Cited

U.S. PATENT DOCUMENTS

| | | | |
|---|---|---|---|
| 6,882,314 | B2 | 4/2005 | Zimmerman et al. |
| 7,012,563 | B1 | 3/2006 | Bustamante et al. |
| 7,023,381 | B2 | 4/2006 | Zimmerman et al. |
| 7,024,215 | B2 | 4/2006 | Krasner |
| 7,321,776 | B2 | 1/2008 | Camp, Jr. et al. |
| 7,590,210 | B2 | 9/2009 | Aweya et al. |
| 7,616,682 | B2 | 11/2009 | Small |
| 7,663,546 | B1 | 2/2010 | Miyamoto et al. |
| 7,679,554 | B1 | 3/2010 | Hwang et al. |
| 7,706,754 | B2 | 4/2010 | Krasner |
| 7,904,110 | B2 | 3/2011 | Young et al. |
| 8,106,821 | B2 | 1/2012 | Farmer et al. |
| 8,373,515 | B2 | 2/2013 | Anandakumar et al. |
| 8,378,921 | B2 | 2/2013 | Delfeld et al. |
| 8,421,672 | B2 | 4/2013 | Jeong et al. |
| 8,466,835 | B2 | 6/2013 | Elwell, Jr. et al. |
| 9,182,497 | B2 | 11/2015 | Geier et al. |
| 2002/0025791 | A1 | 2/2002 | Englert et al. |
| 2003/0058163 | A1 | 3/2003 | Zimmerman et al. |
| 2004/0021603 | A1 | 2/2004 | Zimmerman et al. |
| 2004/0027277 | A1 | 2/2004 | Diggelen et al. |
| 2004/0054470 | A1 | 3/2004 | Farine et al. |
| 2004/0176102 | A1* | 9/2004 | Lawrence et al. ......... 455/456.1 |
| 2005/0015198 | A1 | 1/2005 | Kee et al. |
| 2006/0061691 | A1 | 3/2006 | Rabinowitz et al. |
| 2010/0277338 | A1* | 11/2010 | Laroche ................... 340/825.49 |
| 2011/0263270 | A1* | 10/2011 | Roy et al. .................. 455/456.1 |
| 2011/0285589 | A1 | 11/2011 | Bull |
| 2012/0264450 | A1 | 10/2012 | Kangas et al. |
| 2013/0190009 | A1 | 7/2013 | Johansson et al. |
| 2014/0292569 | A1 | 10/2014 | Wallace et al. |
| 2014/0378171 | A1 | 12/2014 | Rudow et al. |
| 2015/0050907 | A1 | 2/2015 | Rudow et al. |

FOREIGN PATENT DOCUMENTS

| | | |
|---|---|---|
| JP | 2007121066 A | 5/2007 |
| WO | 2005019855 A2 | 3/2005 |
| WO | 2006015265 A2 | 2/2006 |
| WO | 2009132252 A1 | 10/2009 |
| WO | 2013088924 A1 | 6/2013 |

OTHER PUBLICATIONS

Bani Hani, Mohammad Shafiq, et al.; U.S. Appl. No. 14/078,016, filed Nov. 12, 2013; Title: Method and System for Implementing a Dual-Mode Dual-Band GNSS/M-LMS Pseudolites Receiver; 45 pages.

Bani Hani, Mohammad Shafiq, et al.; U.S. Appl. No. 14/136,565, filed Dec. 20, 2013; Title: Method for Improving Clock Accuracy in a Wide Area Positioning Pseudolite Receiver System Architecture; 46 pages.

Lombardi, Michael A., et al.; "Time and Frequency Measurements Using the Global Positioning System"; Cal Lab; Jul.-Sep. 2001; 8 pages.

Lombardi, Michael A.; "The Use of GPS Disciplined Oscillators as Primary Frequency Standards for Calibration and Metrology Laboratories"; Measure: The Journal of Measurement Science; vol. No. 3; Issue No. 3; Sep. 2008; 10 pages.

VE2ZAZ; "10MHz GPS Disciplined Oscillator"; http://pages.cs.wisc.edu/~timec/e/gpsdo.html; Sep. 19, 2013; 11 pages.

Seguin, Mike; "A Simple GPS Stabilized 10 MHz Oscillator"; http://www.ko4bb.com/manuals/74.202.70.30/Simple_10_MHz_GPSDO_N1JEZ.pdf; May 16, 2004; 9 pages.

Wikipedia; "GPS Disciplined Oscillator"; http://en.wikipedia.org/wiki/GPS_disciplined_oscillator; Sep. 19, 2013; 1 page.

Jackson Labs Technologies, Inc.; "GPSOCXO Integrated GPS Disciplined OCXO"; http://www.jackson-labs.com/index.php/products/gps_ocxo; Sep. 19, 2013; 2 pages.

Office Action dated Jan. 27, 2015; U.S. Appl. No. 14/078,016, filed Nov. 12, 2013; 24 pages.

He, Ziming, et al.; "Indoor TDOA Mobile Positioning with Clock Drift and Its Cramer-Rao Bound"; European Wireless Conference; Apr. 16-18, 2013; 6 pages.

Final Office Action dated May 15, 2015; U.S. Appl. No. 14/078,016, filed Nov. 12, 2013; 30 pages.

Advisory Action dated Jul. 21, 2015; U.S. Appl. No. 14/078,016, filed Nov. 12, 2013; 3 pages.

European Extended Search Report; Application No. 14199468.1; May 22, 2015; 11 pages.

Partial European Search Report; Application No. 14192212.0; May 4, 2015; 7 pages.

Kappi, Jani, et al.; "Pressure Altitude Enhanced AGNSS Hybrid Receiver for a Mobile Terminal"; ION GNSS 18th International Technical Meeting of the Satellite Division; Sep. 13-16, 2005; 8 pages.

Zhou, Zebo, et al.; "A Low-Cost Integrated Navigation System of Quadrotor Aerial Vehicle: Design, Development and Performance"; Proceedings of the 26th International Technical Meeting of the ION Satellite Division; Sep. 16-20, 2013; 12 pages.

Office Action dated Sep. 18, 2015; U.S. Appl. No. 14/078,016, filed Nov. 12, 2013; 30 pages.

European Examination Report; Application No. 13172820.6; Aug. 17, 2015; 4 pages.

European Extended Search Report; Application No. 14192212.0; Sep. 7, 2015; 16 pages.

Final Office Action dated Feb. 2, 2016; U.S. Appl. No. 14/078,016, filed Nov. 12, 2013; 24 pages.

Office Action dated Mar. 7, 2016; U.S. Appl. No. 14/136,565, filed Dec. 20, 2013; 31 pages.

Notice of Allowance dated Aug. 18, 2016; U.S. Appl. No. 14/136,565, filed Dec. 20, 2013; 16 pages.

* cited by examiner

ARCHITECTURE AND METHOD TO 4G-MOBILE POSITIONING

BACKGROUND

Many applications for mobile communication devices perform functions based on knowing a location or position of the mobile device. In many instances, GPS (Global Positioning System) is used to determine the position of the mobile device. However, GPS generally does not work well indoors. Thus, various solutions to determining an indoor position of the mobile device combine GPS with other wireless network systems such as WiFi, cellular connections, Ultra Wide Band (UWB), or radio frequency identification (RFID), with varying degrees of accuracy and with increased cost.

One terrestrial-based positioning technology called pseudo-satellites (or "pseudolites") is being adapted for determining a position of mobile devices indoors. Pseudolite systems uses ground-based transmitters or beacons that transmit GPS like signals using the Multilateration Location and Monitoring Service (M-LMS) frequency band in a frequency range from about 902 Megahertz (MHz) to about 928 MHz. Pseudolite networks may provide coverage between about 100 meters to about 10 kilometers and may provide positioning capabilities for urban areas as well as indoor areas. However, building a mobile device to take advantage of pseudolite signals requires building M-LMS circuitry onto an already crowded communication chip of the mobile device.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
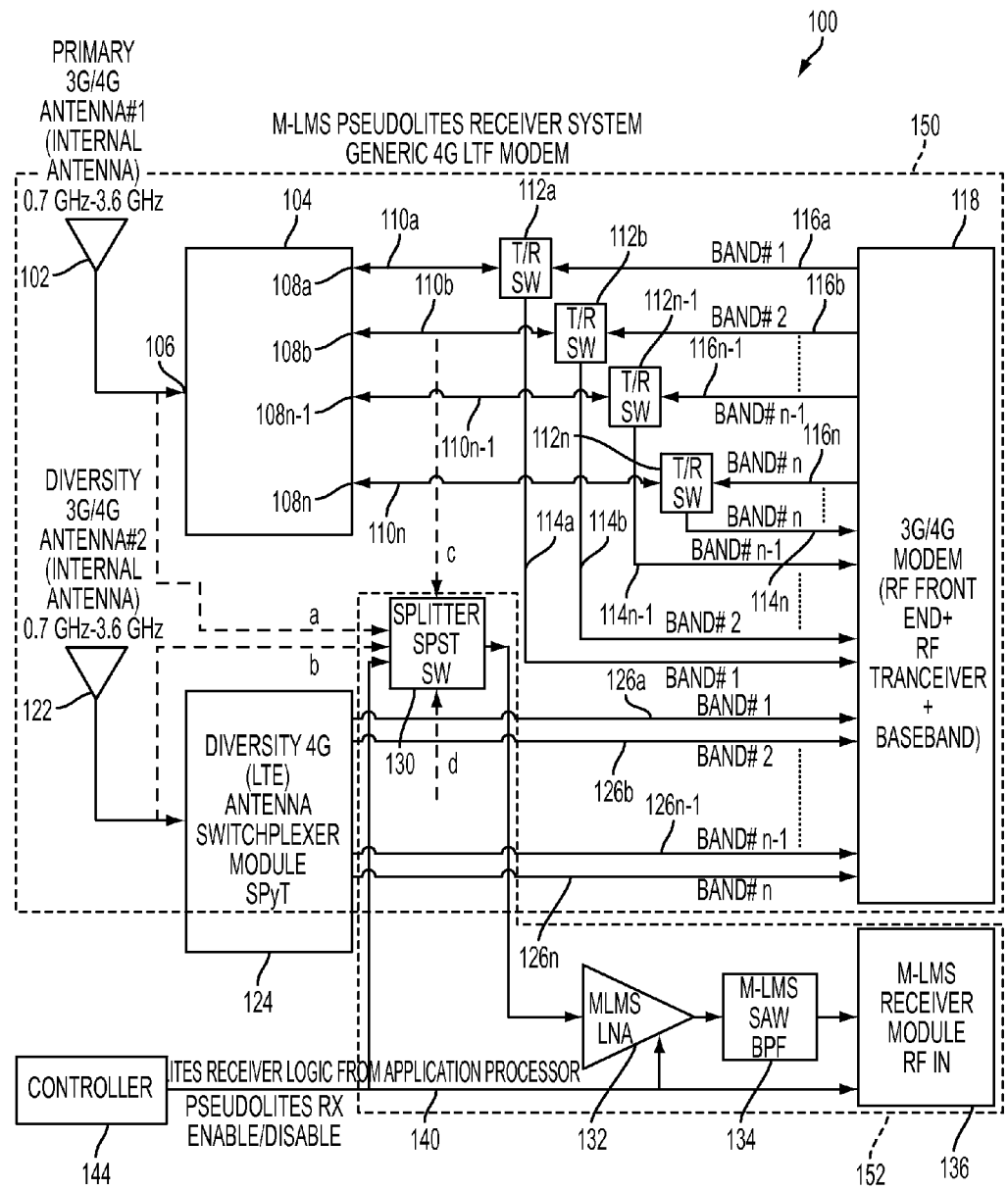
FIG. 1 is a schematic diagram of an exemplary mobile communication device that is suitable for receiving pseudolite positioning signals and determining a location of the mobile communication device therefrom.

FIG. 1 shows a circuit diagram 100 for an exemplary mobile communication device that is suitable for receiving pseudolite positioning signals and determining a location of the mobile communication device therefrom. In various embodiments, the mobile communication device may be a cell phone, a tablet, or other device suitable for mobile communications. The exemplary circuit diagram 100 shows various circuit elements and modules for a communication circuit 150 suitable to perform wireless communication. The exemplary circuit diagram 100 also shows Multilateration Location and Monitoring Service (M-LMS) modules 152 integrated with the communication circuit 150 for determining position of the mobile communication device using terrestrial-based positioning signals such as pseudolite positioning signals.

The communication circuit 150 includes a primary antenna 102 and a secondary (or diversity) antenna 122 that are capable of providing wireless communication over a selected frequency bandwidth of the mobile communication device. In an exemplary embodiment, the selected communication frequency bandwidth may be a third generation (3G) telecommunication bandwidth, a fourth generation (4G) telecommunication bandwidth or other telecommunication bandwidth suitable for mobile devices. In an exemplary embodiment, the selected communication frequency bandwidth is from about 700 Megahertz (MHz) to about 3.6 Gigahertz (GHz). The primary antenna 102 is coupled to a primary antenna switchplexer module 104 that includes a front end port 106 for transmitting and receiving communication signals to and from the primary antenna 102. The primary antenna switchplexer module 104 further includes a plurality of ports 108a-108n at its back end. Each port 108a-108n transmits and receives signals corresponding to a selected bandwidth with back end circuitry 118 over respective channels 110a-110n. In various embodiments, the back end circuitry 118 includes a communication modem 118 such as a 3G communication modem or a 4G communication modem. Communication modems implementing other technologies or communication generations may also be suitable for use with the present disclosure. The communication modem 118 is capable of receiving and transmitting communication signals with a communication network.

Operation of the communication circuit 150 is discussed below with respect to exemplary channel 110a which is selected for illustrative purposes only. Channel 110a is used to communicate signals between the primary antenna switchplexer module 104 and a transmitter/receiver (T/R) switch 112a. The T/R switch 112a may couple channel 110a to either receiver channel 114a or transmitter channel 116, depending on a selected communication mode. The T/R switch 112a may be placed in a receiver mode in which switch 112a couples channel 110a receiver channel 114a. Thus, a signal sent from the primary antenna switchplexer module 104 along channel 110a is received at the communication modem 118 along receiver channel 114a via T/R switch 112a. The T/R switch 112a may also be placed in a transmitter mode in which switch 112a couples channel 110a transmitter channel 116a. In the transmitter mode, a signal for transmission is sent from the communication modem 118 over transmitter channel 116a to the primary antenna switchplexer module 104 via T/R switch 112a. Similarly, T/R switches 112b-112n may couple respective channels 110b-110n to receiver channels 114b-114n in a receiver mode and may couple respective channels 110b-110n to transmitter channels 116b-116n in a transmitter mode.

A secondary antenna 122 (also referred to herein as a diversity antenna 122) is coupled to a diversity antenna switchplexer module 124. The diversity antenna switchplexer module 124 may receive signals from the diversity antenna 122 over a frequency spectrum from about 0.7 MHz to about 3.6 GHz. The diversity antenna switchplexer module 124 transmits the received signals to communication modem 118 over communication channels 126a-126n. Similar to channels 110a-110n, each of channels 126a-126n corresponds to a selected frequency bandwidth.

In various embodiments, the communication circuit 150 may be enabled to provide communication capabilities using any number of communication standards, including Code division multiple access (CDMA), Wideband code division multiple access (WCDMA), High speed packet access (HPSA), and Global System for Mobile Communications (GSM), Long Term Evolution (LTE), Enhanced data rates for GSM evolution (EDGE) or any combination thereof.

The circuit diagram 100 further shows various M-LMS modules 152 suitable for determining a position of the mobile communication device using a pseudolite positioning signals. In various embodiments, the M-LMS modules 152 may be coupled to and/or integrated with the communication circuit 150 in order to obtain a pseudolite positioning signal. The pseudolite positioning signals may be received at either of the primary antenna 102 and the diversity antenna 122 and directed to the M-LMS modules 152 using the methods disclosed herein. Using the wireless communication antennas to receive the pseudolite positioning signals and tapping into the communication circuit 150 to direct the pseudolite positioning signals to the M-LMS modules 152 reduces the number of circuit elements needed for M-LMS position determination and thus reduces the amount of space needed on the chipset to implement the M-LMS modules 152.

Switch 130 which may be a splitter single-pole single-throw switch (SPST SW) is configured to selectively electrically couple M-LMS modules 152 to the existing communication circuit 150 so that pseudolite positioning signals received at the communication circuit 150 may be directed to the M-LMS modules 152. Switch 130 may be located prior to the communication modem 118, or in other words at a location between a selected wireless communication antenna (102, 122) and the communication modem 118. Switch 130 is shown in FIG. 1 to represent a switch and a splitter. In FIGS. 2-5, the switch 130 of FIG. 1 is represented by separate switch and splitter components. In various embodiments, the exemplary switch 130 may be configured to receive the pseudolite positioning signals along one of several paths, labeled 'a', 'b', 'c' and 'd'. Path 'a' provides a channel for receiving the pseudolite positioning signals at switch 130 directly from the primary antenna 102. Path 'b' provides a channel for receiving the pseudolite positioning signals at switch 130 directly from the diversity antenna 122. Path 'c' provides a communication channel for receiving the pseudolite positioning signals at switch 130 from a suitable one of channels 110a-110n at the back end of the primary antenna switchplexer 104. Path 'd' provides a communication channel for receiving the pseudolite positioning signals at switch 130 from a suitable one of channels 126a-126n at the back end of the diversity antenna switchplexer 124. For paths 'c' and 'd', the suitable one of channels 110a-110n or 126a-126n refers to a channel dedicated to a frequency band substantially corresponding to the frequency spectrum of the positioning signals (i.e., from about 902 MHz to about 928 MHz), also referred to as the 900 MHz band. Embodiments showing each individual path are discussed below with respect to FIG. 2-5.

The M-LMS module 152 includes M-LMS low noise amplifier (LNA) 132, filter 134, M-LMS receiver module 136 and switch (SPST SW) 130. In an exemplary embodiment, pseudolite positioning signals received at the switch 130 along one of the various paths 'a', 'b', 'c' and 'd' are sent to the M-LMS low noise amplifier (LNA) circuit 132 for amplification. The amplified signals are sent to an exemplary filter 134 such as the M-LMS saw band-pass filter shown in FIG. 1. After filtering, the pseudolite positioning signals are sent to the M-LMS receiver module 136 that may perform various operations on the pseudolite positioning signals, including an operation to determine a position of the mobile communication device using the pseudolite positioning signals. A control line 140 is coupled to the switch 130, LNA 132 and M-LMS receiver module 136 and a controller 144 provides a signal over the control line 140 to enable or disable these elements. When a 'disable' signal is provided, the M-LMS modules 152 are disconnected from the communication circuit and signals received at the antennae (102, 122) in the pseudolite frequency spectrum (i.e., from about 902 MHz to about 928 MHz) are sent to the communication modem 118. The 'disable' signal may also control the operation of the M-LMS modules 152 and/or place the M-LMS modules 152 in an idle state during communication operations. When an 'enable' signal is provided, the M-LMS modules 152 are electrically coupled to the communication circuit 150 and received signals in the pseudolite frequency spectrum are sent to the LNA 132, filter 134, and M-LMS receiver module 136 through switch 130.

Figure 2:
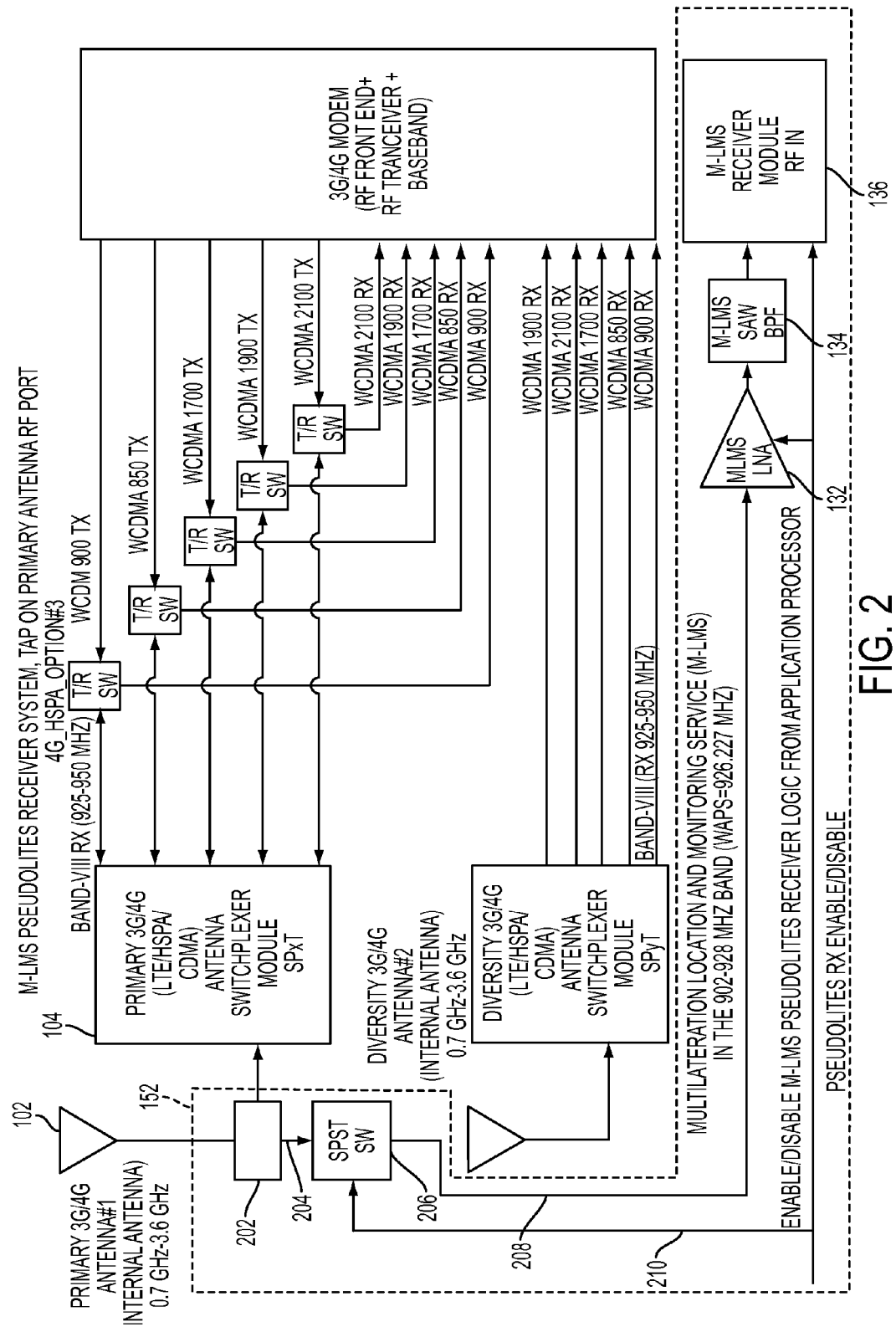
FIG. 2 is a schematic diagram of an exemplary embodiment of the communication circuit of FIG. 1 in which the M-LMS modules are integrated with the communication circuit at the primary antenna.

FIG. 2 shows an exemplary embodiment of the communication circuit 150 of FIG. 1 in which the M-LMS modules 152 are integrated with the communication circuit 150 of FIG. 1 at the primary antenna 102. The embodiment of FIG. 2 corresponds to use of path 'a' of FIG. 1. A splitter 202 is shown at a junction between the primary antenna 102 and the primary antenna switchplexer module 104. The splitter 202 splits the received signal from the primary antenna 102 into two signals, one of which is sent to the primary antenna switchplexer module 104 and the other of which is sent along path 204 to switch 206 which in various embodiments may be single-pole single-throw switch. The splitting process leads to a calibrated loss of about 3 decibels (dB) on the received signals. This loss may be compensated for by signal amplification using a signal amplifier. Control line 210 may provide an 'enable' signal to switch 206 to electrically couple the path 204 to path 208, thereby providing a communication path for the received signal to pass from the primary antenna 102 to low noise amplifier 132, filter 134 and M-LMS receiver module 136.

Figure 3:
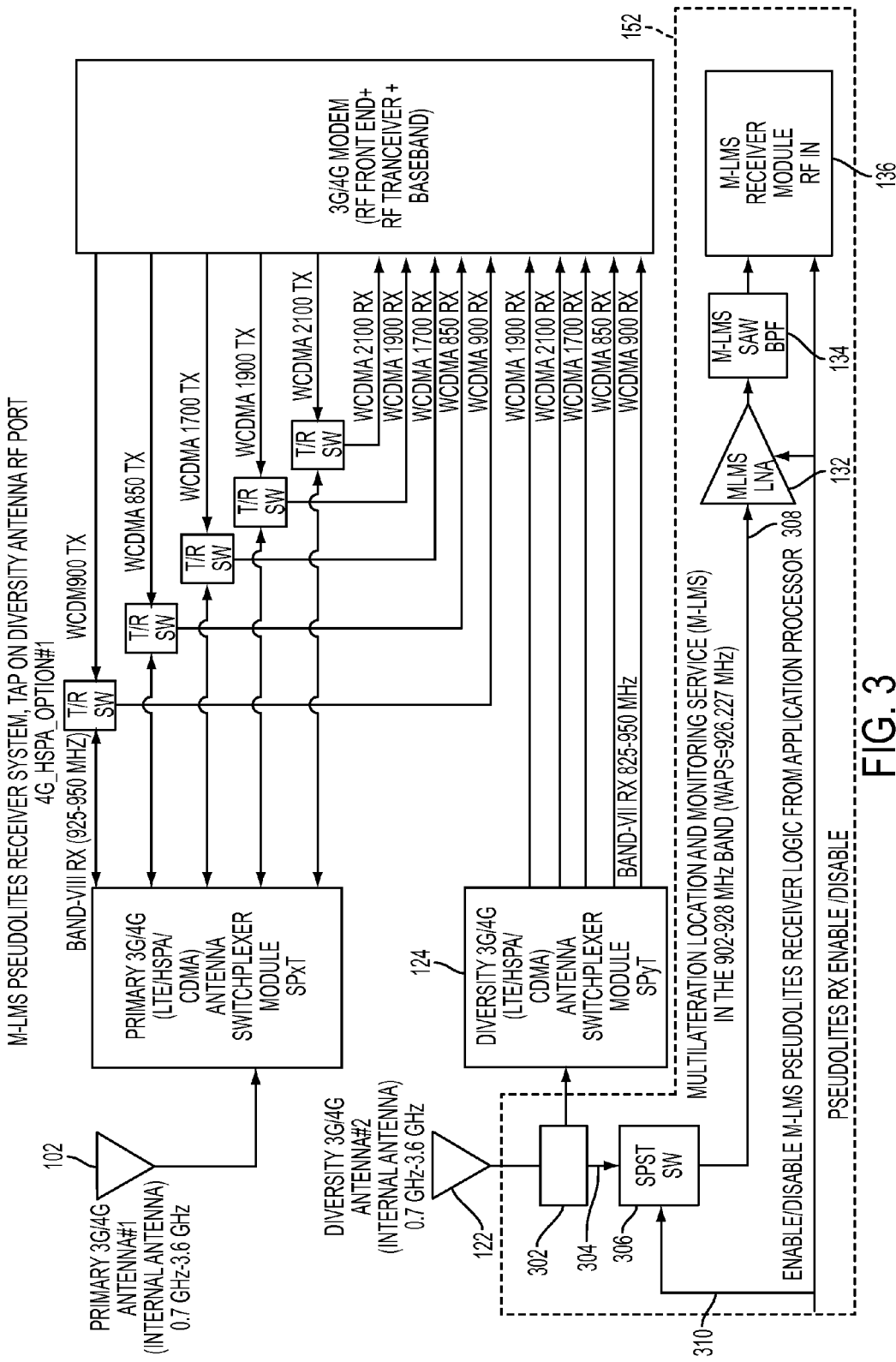
FIG. 3 is a schematic diagram of an alternate embodiment of the communication circuit of FIG. 1 in which the M-LMS positioning module is integrated with the communication circuit at diversity antenna.

FIG. 3 shows an alternate embodiment of the communication circuit of FIG. 1 in which the M-LMS positioning module 152 is integrated with the communication circuit 150 of FIG. 1 at diversity antenna 122. The embodiment of FIG. 3 corresponds to use of path 'b' of FIG. 1. Exemplary splitter 302 is disposed between the diversity antenna 122 and diversity antenna switchplexer module 124 and splits the received signal from the diversity antenna 122 into one signal which is sent to the diversity antenna switchplexer module 124 and another signal which is sent along path 304 to switch 306 which may be single-pole single-throw switch. Control line 310 may provide an 'enable' signal to control the switch 306 to electrically couple path 304 to path 308, thereby providing a communication path for the received signal to pass from the diversity antenna 122 to the low noise amplifier 132, filter 134 and M-LMS receiver module 136.

Figure 4:
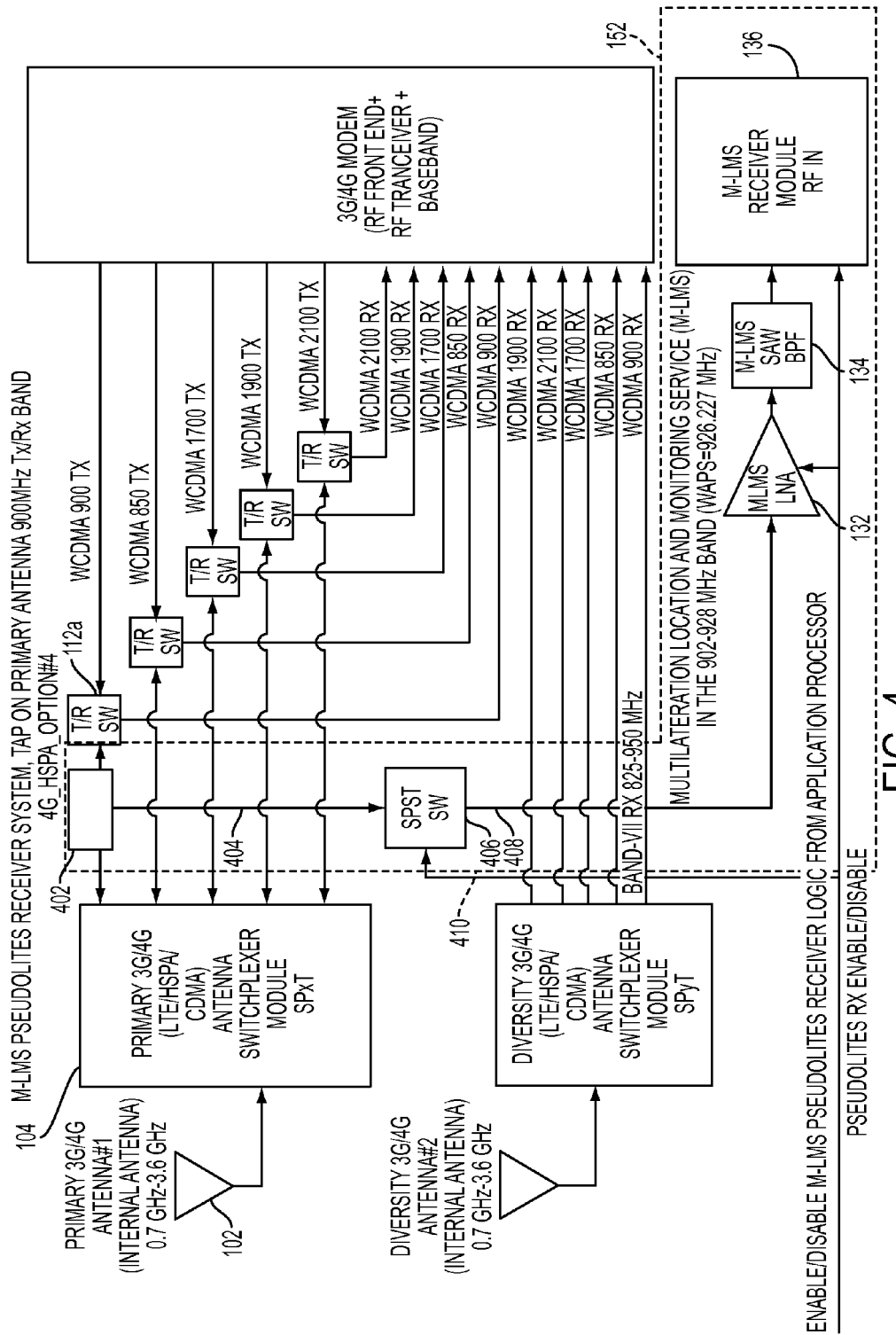
FIG. 4 is a schematic diagram of an alternate embodiment of the communication circuit of FIG. 1 in which the M-LMS modules are integrated with the communication circuit at a selected channel between the primary antenna switchplexer module and a selected transmitter/receiver switch.

FIG. 4 shows an alternate embodiment of the communication circuit of FIG. 1 in which the M-LMS modules 152 are integrated with the communication circuit 150 of FIG. 1 at a selected channel between the primary antenna switchplexer module 104 and a selected transmitter/receiver switch. The embodiment of FIG. 4 corresponds to use of path 'c' of FIG. 1. A splitter 402 is disposed along a channel operating in the pseudolite frequency band. For illustrative purposes, the exemplary splitter 402 is disposed along channel 110a between primary antenna switchplexer module 104 and T/R switch 112a. The splitter 402 splits the signal received from the primary antenna switchplexer module 104 into one signal that is sent to the T/R 112a and another signal that is sent along path 404 to switch 406. Control line 410 may provide an 'enable' signal to control switch 406 to electrically couple the path 404 to path 410, thereby providing a communication path for a pseudolite positioning signal to pass from the primary antenna switchplexer module 104 to low noise amplifier 132, filter 134 and M-LMS receiver module 136.

Figure 5:
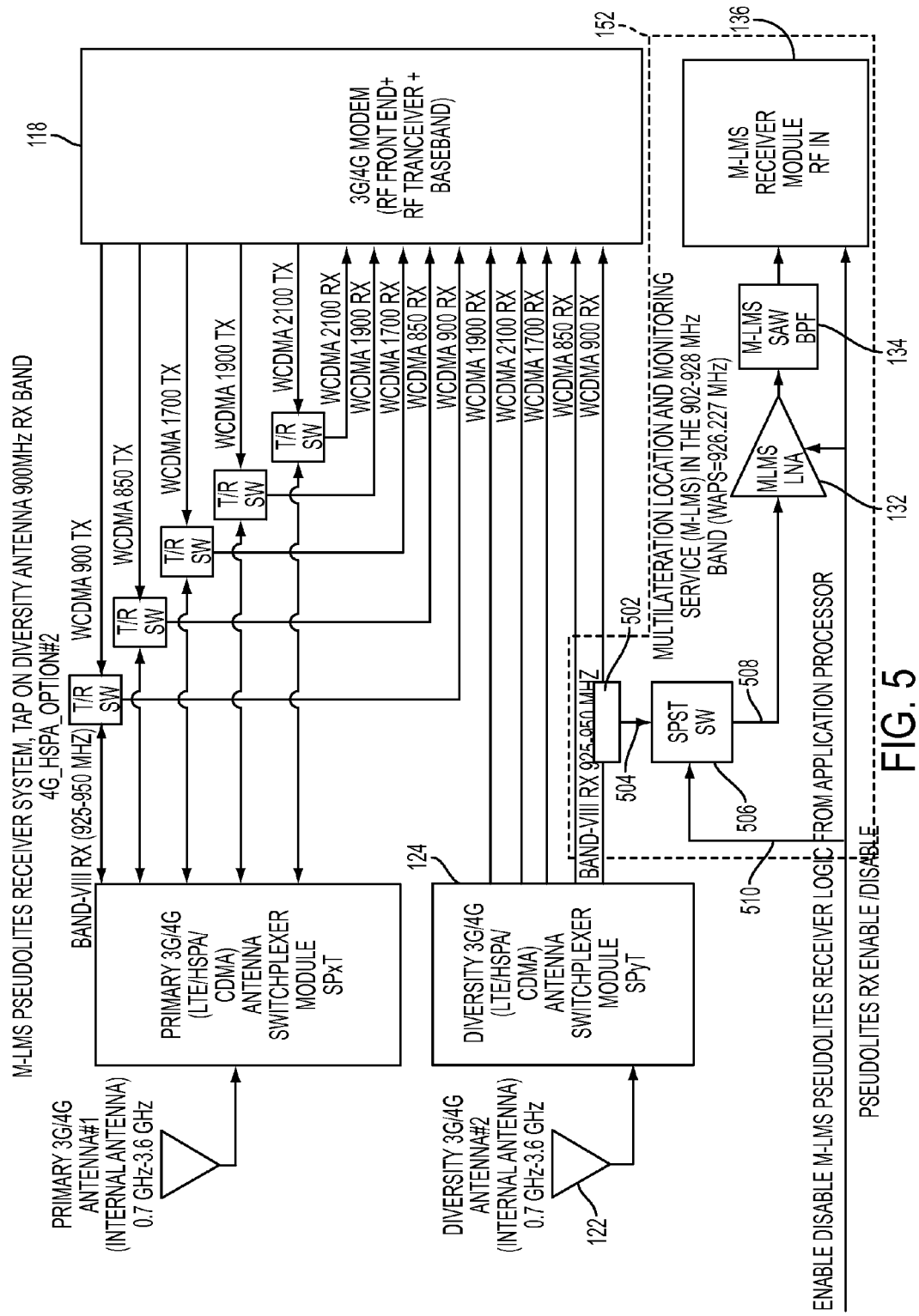
FIG. 5 is a schematic diagram of an alternate embodiment of the communication circuit of FIG. 1 in which the M-LMS modules are integrated with the communication circuit at a selected channel between the diversity antenna switchplexer module and the communication modem.

FIG. 5 shows an alternate embodiment of the communication circuit of FIG. 1 in which the M-LMS modules 152 are integrated with the communication circuit 150 of FIG. 1 at a selected channel between the diversity antenna switchplexer module 124 and the communication modem 118. The embodiment of FIG. 5 corresponds to use of path 'd' of FIG. 1. Exemplary splitter 502 is disposed along channel 126n between diversity antenna switchplexer module 124 and communication modem 118. The splitter 502 splits the received signal into one signal that is sent to the communication modem 118 and another signal that is sent along path 504 to switch 506. Control line 510 may provide an 'enable' signal to control the switch 506 to electrically couple the path 504 to path 508, thereby providing a communication path for the pseudolite positioning signal to pass from the diversity antenna switchplexer module 124 to low noise amplifier 132, filter 134 and M-LMS receiver module 136.

It should be noted that the splitter 202 that taps pseudolite positioning signals directly from the primary antenna 102 as shown in FIG. 2 produces a minimum of 3 dB of signal loss on all signals using the primary antenna 102. To avoid this signal loss at the primary antenna 102, pseudolite beacon signals may be obtained from either the secondary diversity antenna 122 or the appropriate channel of either the primary antenna switchplexer module 104 or the secondary antenna switchplexer module 124 (i.e., via either of paths 'b', 'c' or 'd').

FIGS. 6-9 show flowcharts illustrating a method for implementing the M-LMS modules 152 as shown in either of FIG. 2 or FIG. 3 wherein the pseudolite receiver may be electrically coupled directly to one of the primary antenna 102 or the diversity antenna 122.

Figure 6:
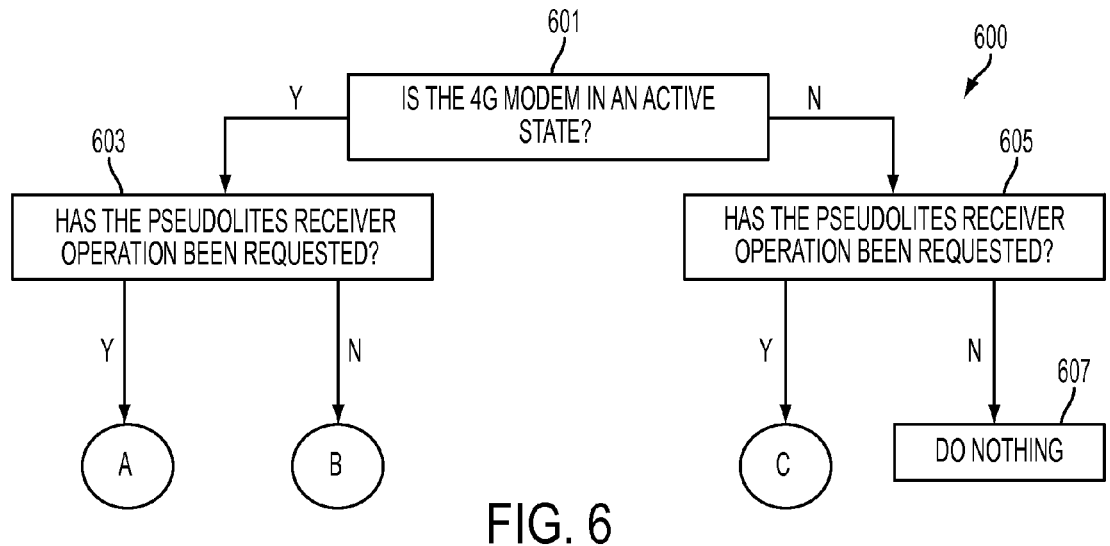
FIG. 6 is a flowchart illustrating a decision tree for implementing the M-LMS modules in an exemplary embodiment of the disclosure.

FIG. 6 shows a flowchart 600 illustrating a decision tree for implementing the M-LMS modules 152 in an exemplary embodiment of the disclosure. In block 601, a determination is made whether the communication modem 118 is in an active state. If the communication modem 118 is active, a determination is made in block 603 whether a pseudolite receiver operation has been requested (i.e., a request to determining position using pseudolite signals). If a pseudolite receiver operation has been requested, then the decision tree passes to flowchart A (see FIG. 7). If a pseudolite receiver operation has not been requested, then the decision tree passes to flowchart B (see FIG. 8). Returning to block 601, if the communication modem is not active, then a determination is made in block 605 whether a pseudolite receiver operation has been requested. If a pseudolite receiver operation has been requested, then the decision tree passes to flowchart C (see FIG. 9). If a pseudolite receiver operation has not been requested, then nothing is done (block 607).

Figure 7:
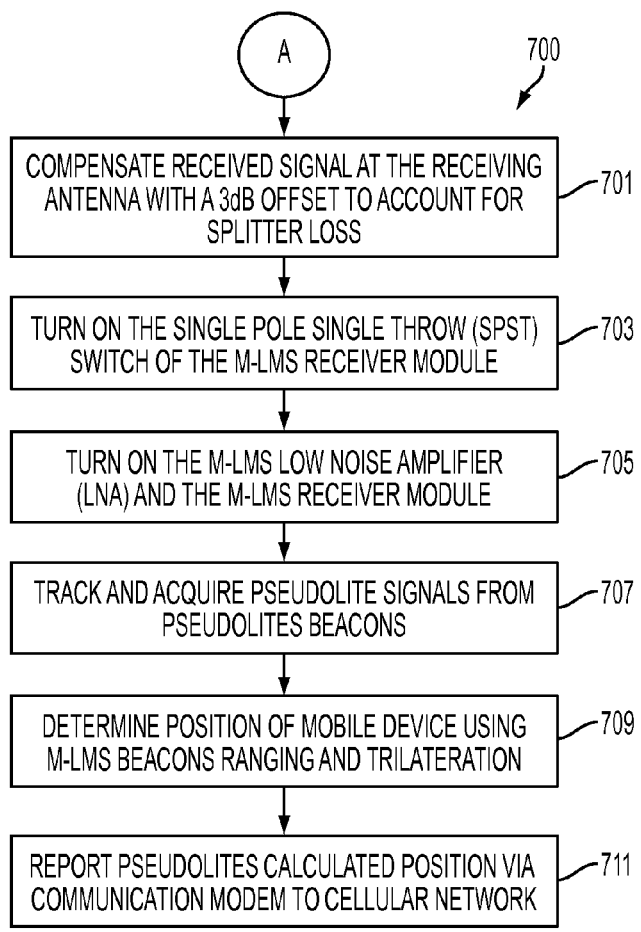
FIG. 7 is a flowchart illustrating an exemplary method for a performing a pseudolite receiver operation when the communication modem is active.

FIG. 7 shows a flowchart 700 illustrating an exemplary method for a performing a pseudolite receiver operation when the communication modem 118 is active. At least a 3 dB signal degradation is to be expected due to presence of the splitter 302. In block 701, a 3 dB offset compensation is applied to the received signal to account for splitter loss. In block 703, the switch 306 is turned on (enabled). In block 705, the M-LMS low noise amplifier (LNA) 132 and the M-LMS receiver module 136 are turned on. The M-LMS receiver module 152 and the communication modem 118 therefore share the diversity antenna 122. In block 707, pseudolite positioning signals are tracked and acquired from pseudolite beacons. In block 709, the position of the mobile device is determined using, for example, beacon ranging and trilateration methods. In block 711, the determined position may be reported via the communication modem 118 to a cellular network.

Figure 8:
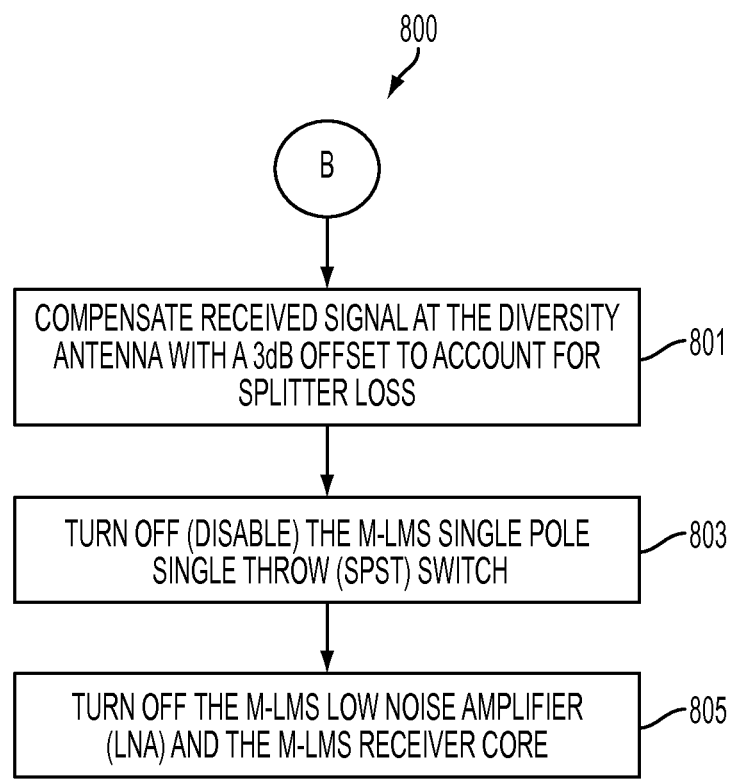
FIG. 8 is a flowchart illustrating a method performed when a pseudolite receiver operation is not requested and the communication modem is active.

FIG. 8 shows a flowchart 800 illustrating a method performed when a pseudolite receiver operation is not requested and the communication modem 118 is active. In block 801, a 3 dB offset compensation is applied to the received signal at the receiving antenna (i.e, either the primary antenna 102 or the diversity antenna 122) to account for splitter loss. In block 803, switch 406 is turned off (disabled). In block 805, the low noise amplifier 132 and the receiver M-LMS receiver module 136 are turned off.

Figure 9:
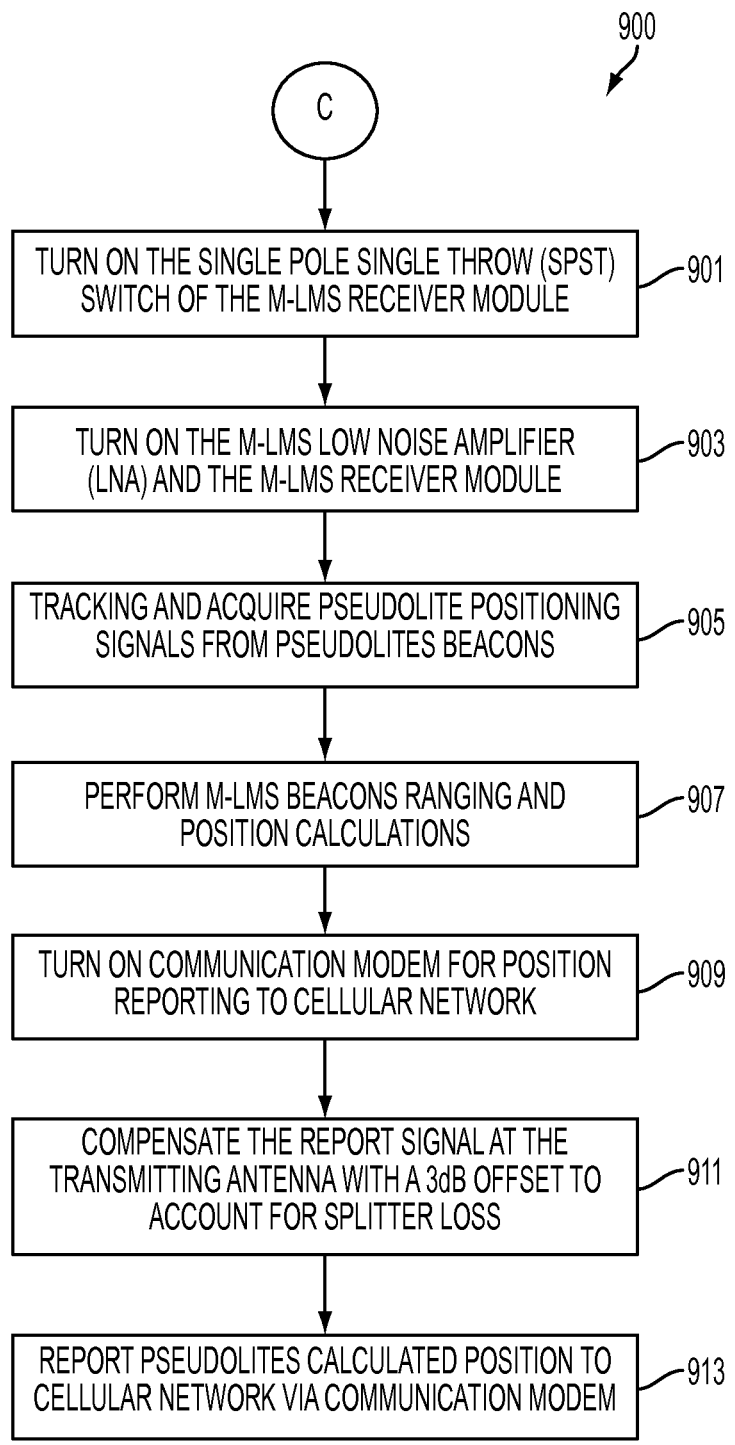
FIG. 9 is a flowchart illustrating a method performed when the communication modem is turned off and a pseudolite receiver operation has been requested.

FIG. 9 shows a flowchart 900 illustrating a method performed when the communication modem is turned off and a pseudolite receiver operation has been requested. In block 901, switch 306 is turned on (enabled). In block 903, the low noise amplifier (LNA) 132 and the M-LMS receiver module 136 are turned on. The 3 dB offset compensation may cover only gain controller compensation, but a cellular receiver in general may suffer a rise in its noise floor due to noise figure degradation and a system receiver sensitivity degradation due to the added 3 dB loss in the RF front end. In block 905, pseudolite signals are tracked and acquired from M-LMS Pseudolite beacons. In block 907, the position of the mobile communication device is determined using various calculations performed using the pseudolite positioning signals. In block 909, the communication modem 118 is turned on (enabled). In block 911, a 3 dB offset is applied to the outgoing reporting signal at the transmitting antenna (i.e., either the primary antenna 102 or the diversity antenna 122) to account for splitter loss. In block 913, the position data is reported to the cellular network using the communication modem 118.

FIGS. 10-13 show flowcharts illustrating a method for implementing the M-LMS modules as shown in FIG. 4 or 5 wherein the pseudolite receiver may be electrically coupled directly to a 900 MHz band output port of either the primary antenna switchplexer module 104 or the diversity antenna switchplexer module 124.

Figure 10:
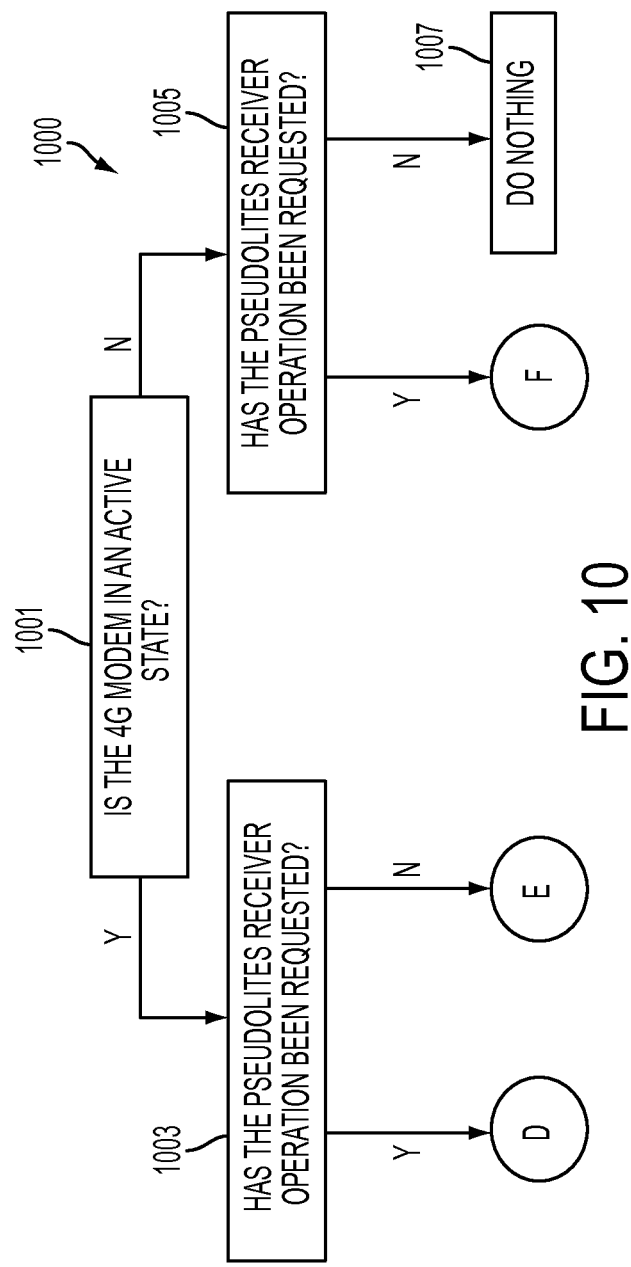
FIG. 10 is a flowchart illustrating a decision tree for implementing the M-LMS modules in an exemplary embodiment of the disclosure.

FIG. 10 shows a flowchart 1000 illustrating a decision tree for implementing the M-LMS modules 152 in an exemplary embodiment of the disclosure. In block 1001, a determination is made whether the communication modem 118 is in an active state. If the communication modem 118 is active, a determination is made in block 1003 whether a pseudolite receiver operation has been requested. If a pseudolite receiver operation has been requested, then the decision tree passes to flowchart D (see FIG. 11). If a pseudolite receiver operation has not been requested, then the decision tree passes to flowchart E (see FIG. 12). Returning to block 1001, if the communication modem is not active, then a determination is made in block 1005 whether a pseudolite receiver operation has been requested. If a pseudolite receiver operation has been requested, then the decision tree passes to flowchart F (see FIG. 13). If a pseudolite receiver operation has not been requested, then nothing is done (block 1007).

Figure 11:
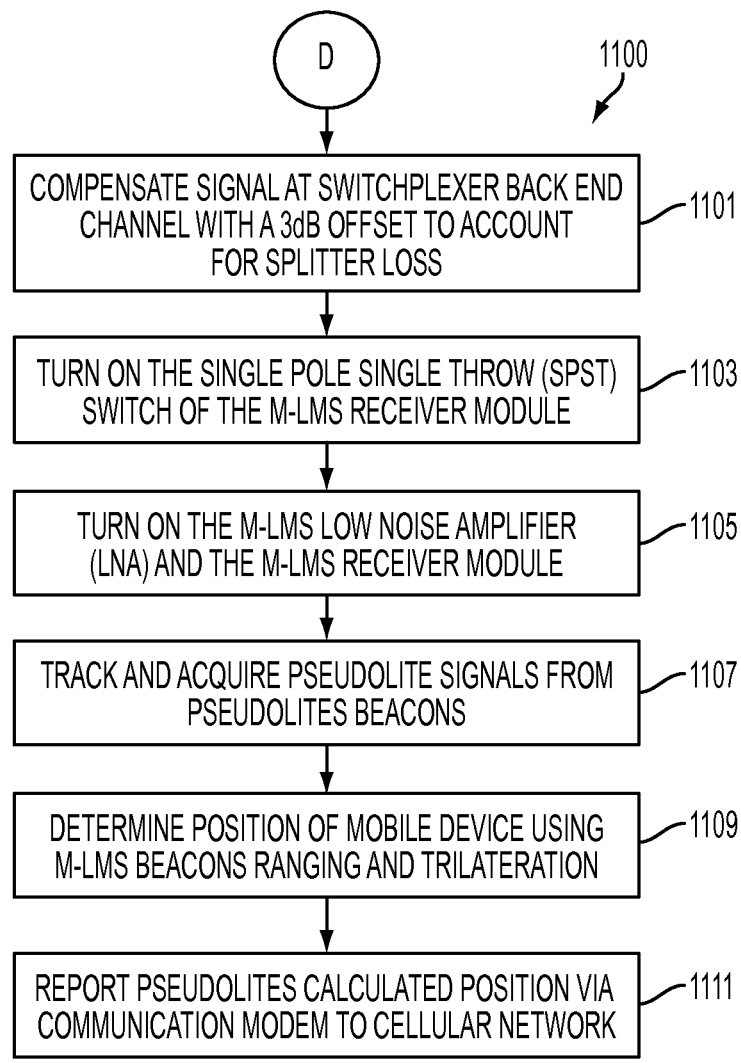
FIG. 11 is a flowchart illustrating an exemplary method for a performing a pseudolite receiver operation when the communication modem is active.

FIG. 11 shows a flowchart 1100 illustrating an exemplary method for performing a pseudolite receiver operation when the communication modem 118 is active. At least a 3 dB signal degradation is to be expected due to presence of the splitter (402, 502). In block 1101, a 3 dB offset compensation is applied to the received signal to account for splitter loss. In block 1103, the switch (402, 502) is turned on (enabled). In block 1105, the M-LMS low noise amplifier (LNA) 132 and the M-LMS receiver module 136 are turned on. The M-LMS receiver module 136 and the communication modem 118 therefore share the channel. In block 1107, pseudolite positioning signals are tracked and acquired from pseudolite beacons. In block 1109, the position of the mobile device is determined using, for example, beacon ranging and trilateration methods. In block 1111, the determined position is reported via the communication modem 118 to a cellular network.

Figure 12:
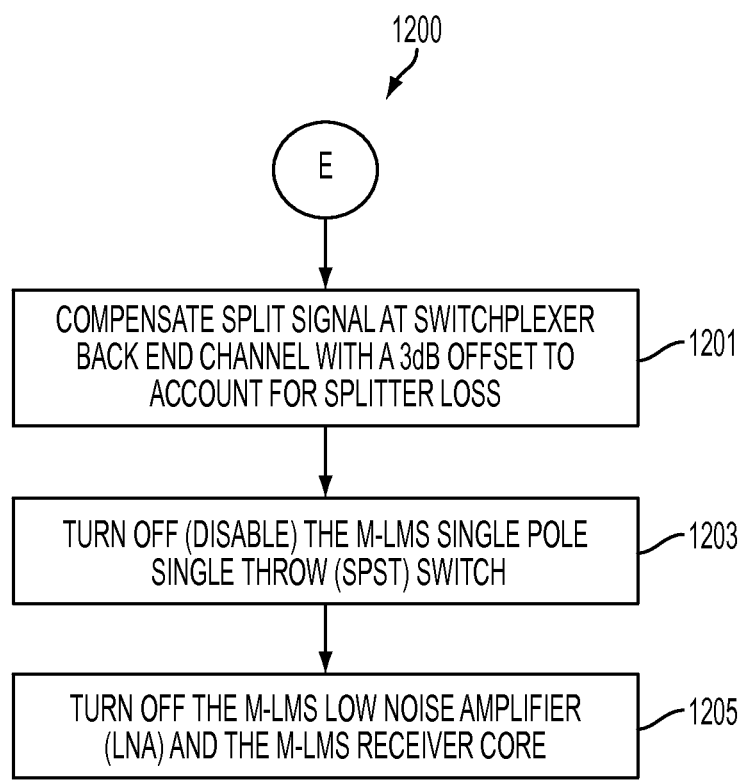
FIG. 12 is a flowchart illustrating a method performed when a pseudolite receiver operation is not requested and the communication modem is active.

FIG. 12 shows a flowchart 1200 illustrating a method performed when a pseudolite receiver operation is not requested and the communication modem 118 is active. In block 1201, a 3 dB offset compensation is applied to the received signal at the primary or diversity antenna to account for splitter loss. This received signal is sent to the communication modem 118. In block 1203, switch (406, 506) is turned off (disabled). In block 1205, the low noise amplifier 132 and the receiver M-LMS receiver module 136 are turned off.

Figure 13:
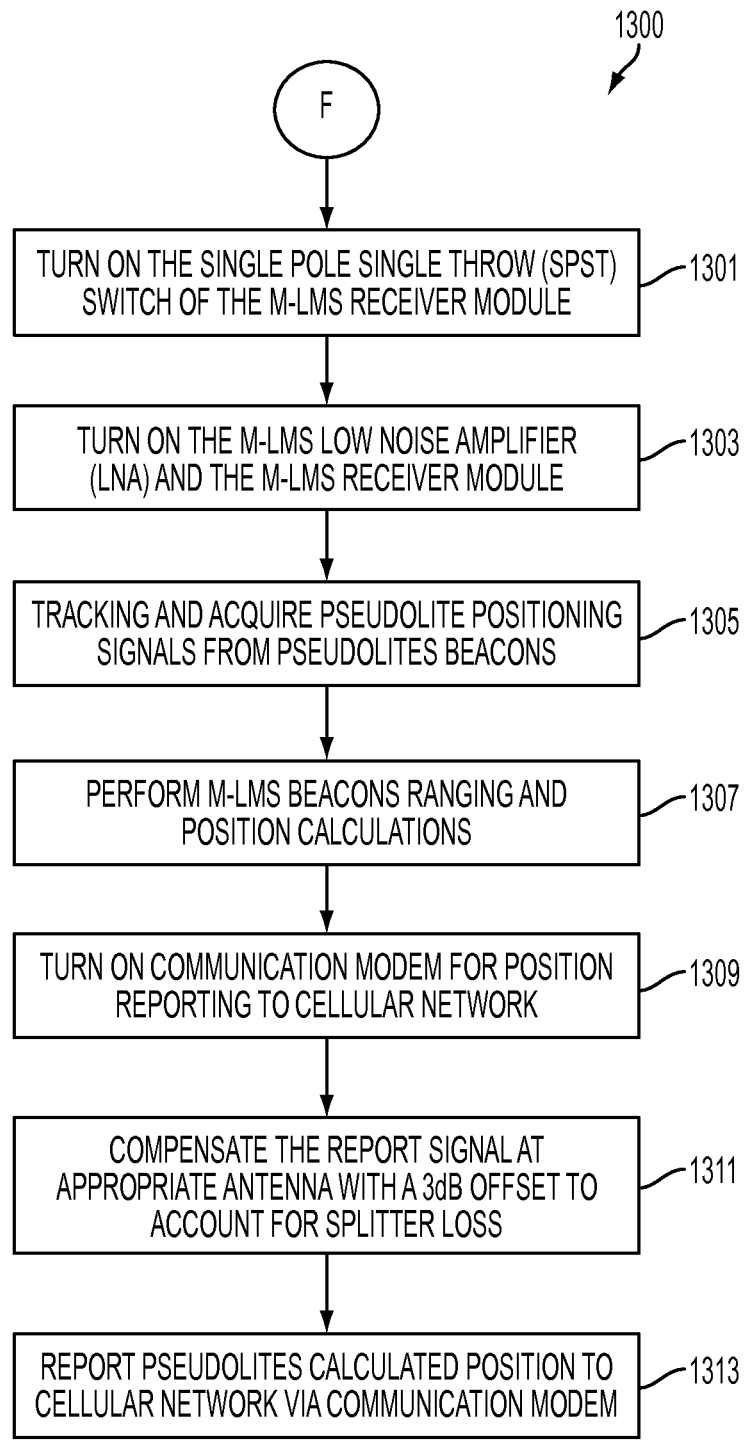
FIG. 13 is a flowchart illustrating a method performed when the communication modem is turned off and a pseudolite receiver operation has been requested.

FIG. 13 show a flowchart 1300 illustrating a method performed when the communication modem is turned off and a pseudolite receiver operation has been requested. In block 1301, switch (406, 506) is turned on (enabled). In block 1303, the low noise amplifier (LNA) 132 and the M-LMS receiver module 136 are turned on. In block 1305, pseudolite signals are tracked and acquired from M-LMS pseudolite beacons. In block 1307, the position of the mobile communication device is determined using various calculations performed using the pseudolite positioning signals. In block 1309, the communication modem 118 is turned on (enabled). In block 1311, a 3 dB offset is applied to the outgoing reporting signal at the primary or diversity antenna to account for splitter loss. In block 1313, the position data is reported to the cellular network using the communication modem 118.

Figure 14:
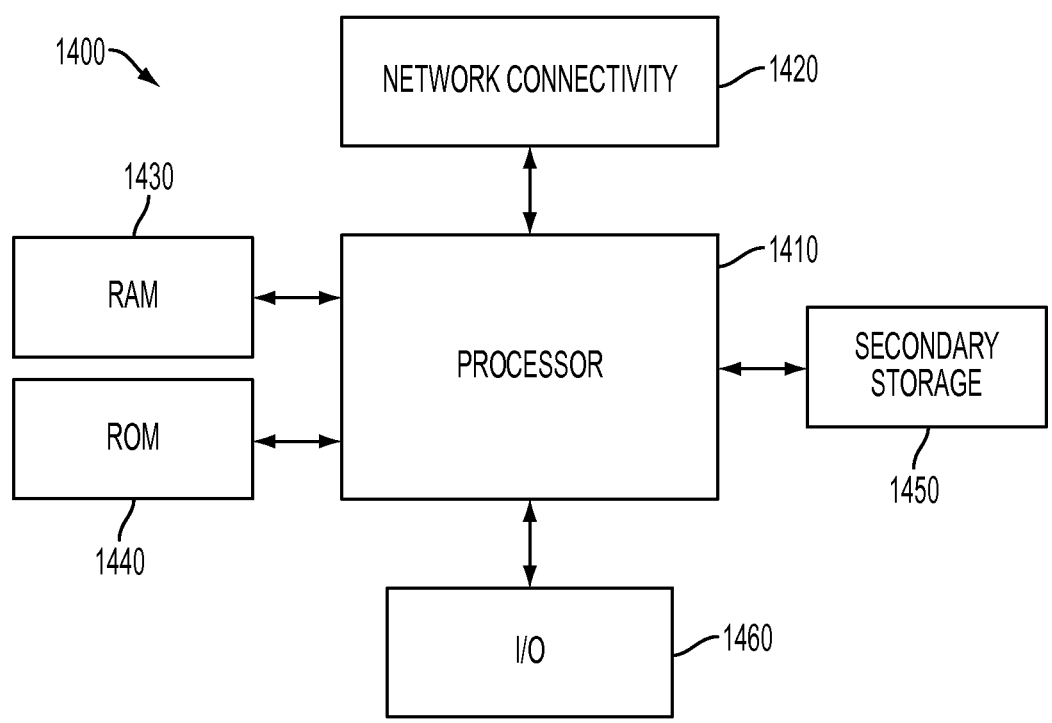
FIG. 14 illustrates an example of a system suitable for implementing one or more embodiments disclosed herein.

FIG. 14 illustrates an example of a system 1400 suitable for implementing one or more embodiments disclosed herein. In various embodiments, the system 1400 comprises a processor 1410, which may be referred to as a central processor unit (CPU) or digital signal processor (DSP), or Application Processor (AP), network connectivity interfaces 1420, random access memory (RAM) 1430, read only memory (ROM) 1440, secondary storage 1450, and input/output (I/O) devices 1460. In some embodiments, some of these components may not be present or may be combined in various combinations with one another or with other components not shown. These components may be located in a single physical entity or in more than one physical entity. Any actions described herein as being taken by the processor 1410 might be taken by the processor 1410 alone or by the processor 1410 in conjunction with one or more components shown or not shown in FIG. 14.

The processor 1410 executes instructions, codes, computer programs, or scripts that it might access from the network connectivity interfaces 1420, RAM 1430, or ROM 1440. While only one processor 1410 is shown, multiple processors may be present. Thus, while instructions may be discussed as being executed by a processor 1410, the instructions may be executed simultaneously, serially, or otherwise by one or multiple processors 1410 implemented as one or more CPU chips.

In various embodiments, the network connectivity interfaces 1420 may take the form of modems, modem banks, Ethernet devices, universal serial bus (USB) interface devices, serial interfaces, token ring devices, fiber distributed data interface (FDDI) devices, wireless local area network (WLAN) devices (including radio, optical or infrared signals), radio transceiver devices such as code division multiple access (CDMA) devices, global system for mobile communications (GSM) radio transceiver devices, long term evolution (LTE) radio transceiver devices, worldwide interoperability for microwave access (WiMAX) devices, and/or other well-known interfaces for connecting to networks, including Personal Area Networks (PANs) such as Bluetooth. These network connectivity interfaces 1420 may enable the processor 1410 to communicate with the Internet or one or more telecommunications networks or other networks from which the processor 1410 might receive information or to which the processor 1410 might output information.

The network connectivity interfaces 1420 may also be capable of transmitting or receiving data wirelessly in the form of electromagnetic waves, such as radio frequency signals or microwave frequency signals. Information transmitted or received by the network connectivity interfaces 1420 may include data that has been processed by the processor 1410 or instructions that are to be executed by processor 1410. The data may be ordered according to different sequences as may be desirable for either processing or generating the data or transmitting or receiving the data.

In various embodiments, the RAM 1430 may be used to store volatile data and instructions that are executed by the processor 1410. The ROM 1440 shown in FIG. 14 may likewise be used to store instructions and data that is read during execution of the instructions. The secondary storage 1450 is typically comprised of one or more disk drives, solid state drives, or tape drives and may be used for non-volatile storage of data or as an overflow data storage device if RAM 1430 is not large enough to hold all working data. Secondary storage 1450 may likewise be used to store programs that are loaded into RAM 1430 when such programs are selected for execution. The I/O devices 1460 may include liquid crystal displays (LCDs), Light Emitting Diode (LED) displays, Organic Light Emitting Diode (OLED) displays, projectors, televisions, touch screen displays, keyboards, keypads, switches, dials, mice, track balls, track pads, voice recognizers, card readers, paper tape readers, printers, video monitors, or other well-known input/output devices.

Figure 15:
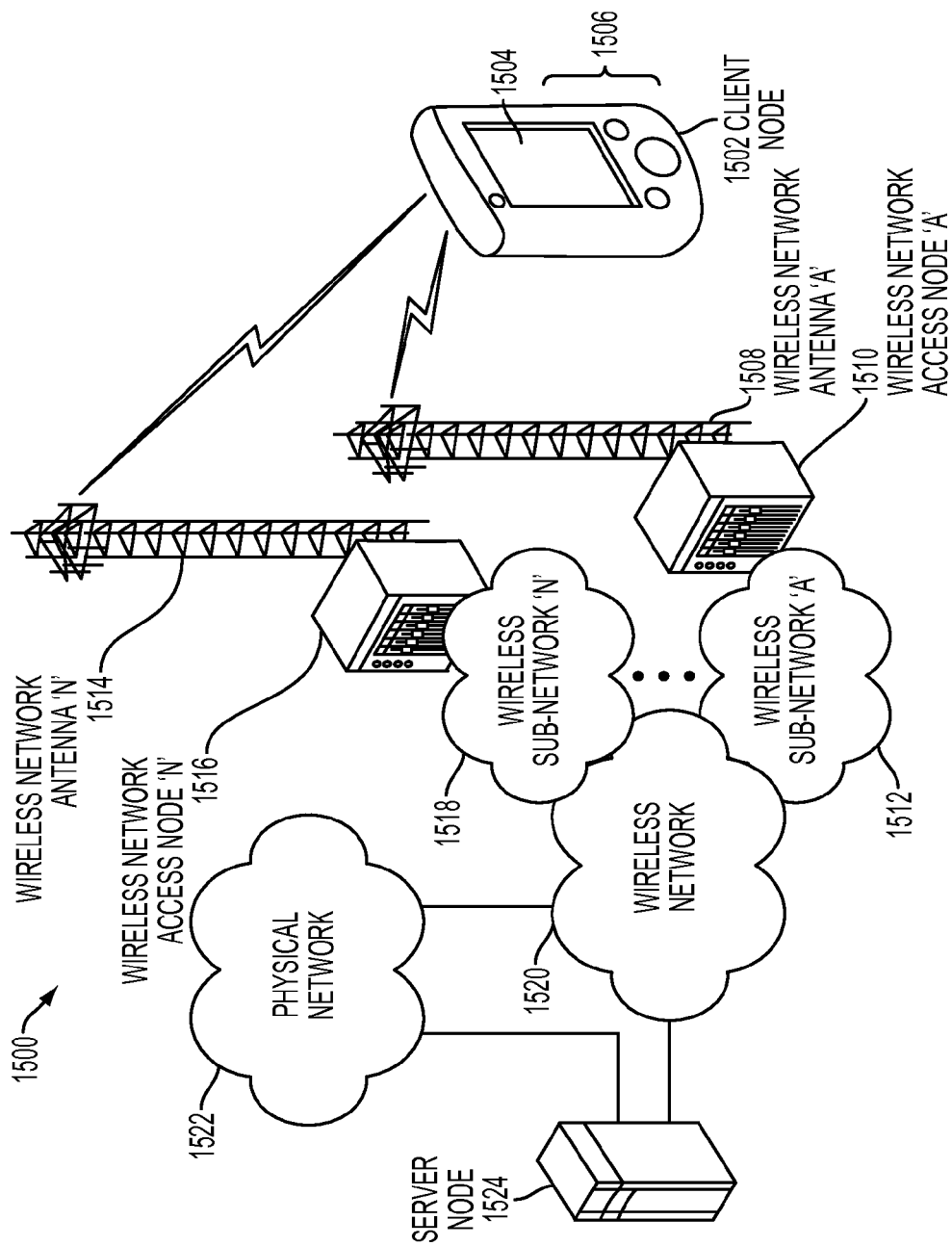
FIG. 15 shows a wireless-enabled communications environment including an embodiment of a client node as implemented in an embodiment of the disclosure.

FIG. 15 shows a wireless-enabled communications environment including an embodiment of a client node as implemented in an embodiment of the disclosure. Though illustrated as a mobile phone, the client node 1502 may take various forms including a wireless handset, a pager, a smart phone, or a personal digital assistant (PDA). In various embodiments, the client node 1502 may also comprise a portable computer, a tablet computer, a laptop computer, or any computing device operable to perform data communication operations. Many suitable devices combine some or all of these functions. In some embodiments, the client node 1502 is not a general purpose computing device like a portable, laptop, or tablet computer, but rather is a special-purpose communications device such as a telecommunications device installed in a vehicle. The client node 1502 may likewise be a device, include a device, or be included in a device that has similar capabilities but that is not transportable, such as a desktop computer, a set-top box, or a network node. In these and other embodiments, the client node 1502 may support specialized activities such as gaming, inventory control, job control, task management functions, and so forth.

In various embodiments, the client node 1502 includes a display 1504. In these and other embodiments, the client node 1502 may likewise include a touch-sensitive surface, a keyboard or other input keys 1506 generally used for input by a user. The input keys 1506 may likewise be a full or reduced alphanumeric keyboard such as QWERTY, DVORAK, AZERTY, and sequential keyboard types, or a traditional numeric keypad with alphabet letters associated with a telephone keypad. The input keys 1506 may likewise include a trackwheel, an exit or escape key, a trackball, and other navigational or functional keys, which may be moved to different positions, e.g., inwardly depressed, to provide further input function. The client node 1502 may likewise present options for the user to select, controls for the user to actuate, and cursors or other indicators for the user to direct.

The client node 1502 may further accept data entry from the user, including numbers to dial or various parameter values for configuring the operation of the client node 1502. The client node 1502 may further execute one or more software or firmware applications in response to user commands. These applications may configure the client node 1502 to perform various customized functions in response to user interaction. Additionally, the client node 1502 may be programmed or configured over-the-air (OTA), for example from a wireless network access node 'A' 1510 through 'n' 1516 (e.g., a base station), a server node 1524 (e.g., a host computer), or a peer client node 1502.

Among the various applications executable by the client node 1502 are a web browser, which enables the display 1504 to display a web page. The web page may be obtained from a server node 1524 through a wireless connection with a wireless network 1520. As used herein, a wireless network 1520 broadly refers to any network using at least one wireless connection between two of its nodes. The various applications may likewise be obtained from a peer client node 1502 or other system over a connection to the wireless network 1520 or any other wirelessly-enabled communication network or system.

In various embodiments, the wireless network 1520 comprises a plurality of wireless sub-networks (e.g., cells with corresponding coverage areas) 'A' 1512 through 'n' 1518. As used herein, the wireless sub-networks 'A' 1512 through 'n' 1518 may variously comprise a mobile wireless access network or a fixed wireless access network. In these and other embodiments, the client node 1502 transmits and receives communication signals, which are respectively communicated to and from the wireless network nodes 'A' 1510 through 'n' 1516 by wireless network antennas 'A' 1508 through 'n' 1514 (e.g., cell towers). In turn, the communication signals are used by the wireless network access nodes 'A' 1510 through 'n' 1516 to establish a wireless communication session with the client node 1502. As used herein, the network access nodes 'A' 1510 through 'n' 1516 broadly refer to any access node of a wireless network. As shown in FIG. 15, the wireless network access nodes 'A' 1510 through 'n' 1516 are respectively coupled to wireless sub-networks 'A' 1512 through 'n' 1518, which are in turn connected to the wireless network 1520.

In various embodiments, the wireless network 1520 is coupled to a core network 1522, e.g., a global computer network such as the Internet. Via the wireless network 1520 and the core network 1522, the client node 1502 has access to information on various hosts, such as the server node 1524. In these and other embodiments, the server node 1524 may provide content that may be shown on the display 1504 or used by the client node processor 1410 for its operations. Alternatively, the client node 1502 may access the wireless network 1520 through a peer client node 1502 acting as an intermediary, in a relay type or hop type of connection. As another alternative, the client node 1502 may be tethered and obtain its data from a linked device that is connected to the wireless sub-network 1512. Skilled practitioners of the art will recognize that many such embodiments are possible and the foregoing is not intended to limit the spirit, scope, or intention of the disclosure.

Figure 16:
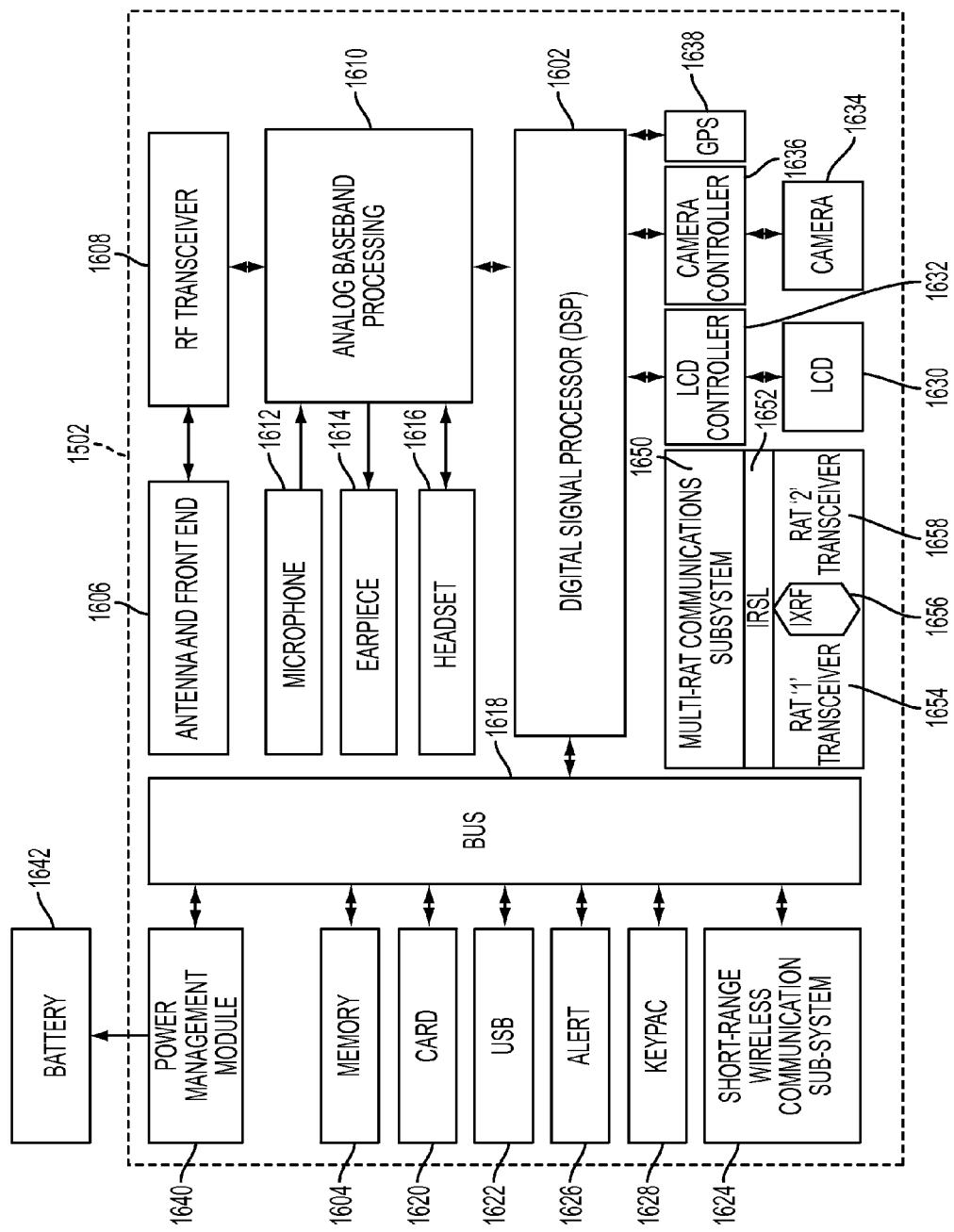
FIG. 16 depicts a block diagram of an exemplary client node as implemented with a digital signal processor (DSP) in accordance with an embodiment of the disclosure.

FIG. 16 depicts a block diagram of an exemplary client node as implemented with a digital signal processor (DSP) in accordance with an embodiment of the disclosure. While various components of a client node 1502 are depicted, various embodiments of the client node 1502 may include a subset of the listed components or additional components not listed. As shown in FIG. 16, the client node 1502 includes a DSP 1602 and a memory 1604. As shown, the client node 1502 may further include an antenna and front end unit 1606, a radio frequency (RF) transceiver 1608, an analog baseband processing unit 1610, a microphone 1612, an earpiece speaker 1614, a headset port 1616, a bus 1618, such as a system bus or an input/output (I/O) interface bus, a removable memory card 1620, a universal serial bus (USB) port 1622, a short range wireless communication sub-system 1624, an alert 1626, a keypad 1628, a liquid crystal display (LCD) 1630, which may include a touch sensitive surface, an LCD controller 1632, a charge-coupled device (CCD) camera 1634, a camera controller 1636, and a global positioning system (GPS) sensor 1638, and a power management module 1640 operably coupled to a power storage unit, such as a battery 1642. In various embodiments, the client node 1502 may include another kind of display that does not provide a touch sensitive screen. In one embodiment, the DSP 1602 communicates directly with the memory 1604 without passing through the input/output interface ("Bus") 1618.

In various embodiments, the DSP 1602 or some other form of controller or central processing unit (CPU) operates to control the various components of the client node 1502 in accordance with embedded software or firmware stored in memory 1604 or stored in memory contained within the DSP 1602 itself. In addition to the embedded software or firmware, the DSP 1602 may execute other applications stored in the memory 1604 or made available via information media such as portable data storage media like the removable memory card 1620 or via wired or wireless network communications. The application software may comprise a compiled set of machine-readable instructions that configure the DSP 1602 to provide the desired functionality, or the application software may be high-level software instructions to be processed by an interpreter or compiler to indirectly configure the DSP 1602.

The antenna and front end unit 1606 may be provided to convert between wireless signals and electrical signals, enabling the client node 1502 to send and receive information from a cellular network or some other available wireless communications network or from a peer client node 1502. In an embodiment, the antenna and front end unit 1606 may include multiple antennas to support beam forming and/or multiple input multiple output (MIMO) operations. As is known to those skilled in the art, MIMO operations may provide spatial diversity, which can be used to overcome difficult channel conditions or to increase channel throughput. Likewise, the antenna and front-end unit 1606 may include antenna tuning or impedance matching components, RF power amplifiers, or low noise amplifiers.

In various embodiments, the RF transceiver 1608 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 1610 or the DSP 1602 or other central processing unit. In some embodiments, the RF Transceiver 1608, portions of the Antenna and Front End 1606, and the analog base band processing unit 1610 may be combined in one or more processing units and/or application specific integrated circuits (ASICs).

Note that in this diagram the radio access technology (RAT) RAT1 and RAT2 transceivers 1654, 1658, the IXRF 1656, the IRSL 1652 and Multi-RAT subsystem 1650 are operably coupled to the RF transceiver 1608 and analog baseband processing unit 1610 and then also coupled to the antenna and front end 1606 via the RF transceiver 1608. As there may be multiple RAT transceivers, there will typically be multiple antennas or front ends 1606 or RF transceivers 1608, one for each RAT or band of operation.

The analog baseband processing unit 1610 may provide various analog processing of inputs and outputs for the RF transceivers 1608 and the speech interfaces (1612, 1614, 1616). For example, the analog baseband processing unit 1610 receives inputs from the microphone 1612 and the headset 1616 and provides outputs to the earpiece 1614 and the headset 1616. To that end, the analog baseband processing unit 1610 may have ports for connecting to the built-in microphone 1612 and the earpiece speaker 1614 that enable the client node 1502 to be used as a cell phone. The analog baseband processing unit 1610 may further include a port for connecting to a headset or other hands-free microphone and speaker configuration. The analog baseband processing unit 1610 may provide digital-to-analog conversion in one signal direction and analog-to-digital conversion in the opposing signal direction. In various embodiments, at least some of the functionality of the analog baseband processing unit 1610 may be provided by digital processing components, for example by the DSP 1602 or by other central processing units.

The DSP 1602 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 1602 may perform modulation, coding, interleaving, and spreading, and for a receiver function the DSP 1602 may perform despreading, deinterleaving, decoding, and demodulation. In another embodiment, for example in an orthogonal frequency division multiplex access (OFDMA) technology application, for the transmitter function the DSP 1602 may perform modulation, coding, interleaving, inverse fast Fourier transforming, and cyclic prefix appending, and for a receiver function the DSP 1602 may perform cyclic prefix removal, fast Fourier transforming, deinterleaving, decoding, and demodulation. In other wireless technology applications, yet other signal processing functions and combinations of signal processing functions may be performed by the DSP 1602.

The DSP 1602 may communicate with a wireless network via the analog baseband processing unit 1610. In some embodiments, the communication may provide Internet connectivity, enabling a user to gain access to content on the Internet and to send and receive e-mail or text messages. The input/output interface 1618 interconnects the DSP 1602 and various memories and interfaces. The memory 1604 and the removable memory card 1620 may provide software and data to configure the operation of the DSP 1602. Among the interfaces may be the USB interface 1622 and the short range wireless communication sub-system 1624. The USB interface 1622 may be used to charge the client node 1502 and may also enable the client node 1502 to function as a peripheral device to exchange information with a personal computer or other computer system. The short range wireless communication sub-system 1624 may include an infrared port, a Bluetooth interface, an IEEE 802.11 compliant wireless interface, or any other short range wireless communication sub-system, which may enable the client node 1502 to communicate wirelessly with other nearby client nodes and access nodes. The short-range wireless communication Sub-system 1624 may also include suitable RF Transceiver, Antenna and Front End subsystems.

The input/output interface ("Bus") 1618 may further connect the DSP 1602 to the alert 1626 that, when triggered, causes the client node 1502 to provide a notice to the user, for example, by ringing, playing a melody, or vibrating. The alert 1626 may serve as a mechanism for alerting the user to any of various events such as an incoming call, a new text message, and an appointment reminder by silently vibrating, or by playing a specific pre-assigned melody for a particular caller.

The keypad 1628 couples to the DSP 1602 via the I/O interface ("Bus") 1618 to provide one mechanism for the user to make selections, enter information, and otherwise provide input to the client node 1502. The keyboard 1628 may be a full or reduced alphanumeric keyboard such as QWERTY, DVORAK, AZERTY and sequential types, or a traditional numeric keypad with alphabet letters associated with a telephone keypad. The input keys may likewise include a trackwheel, track pad, an exit or escape key, a trackball, and other navigational or functional keys, which may be inwardly depressed to provide further input function. Another input mechanism may be the LCD 1630, which may include touch screen capability and also display text and/or graphics to the user. The LCD controller 1632 couples the DSP 1602 to the LCD 1630.

The CCD camera 1634, if equipped, enables the client node 1502 to make digital pictures. The DSP 1502 communicates with the CCD camera 1634 via the camera controller 1636. In another embodiment, a camera operating according to a technology other than Charge Coupled Device cameras may be employed. The GPS sensor 1638 is coupled to the DSP 1602 to decode global positioning system signals or other navigational signals, thereby enabling the client node 1502 to determine its position. The GPS sensor 1638 may be coupled to an antenna and front end (not shown) suitable for its band of operation. Various other peripherals may also be included to provide additional functions, such as radio and television reception.

In various embodiments, the client node (e.g., 1502) comprises a first Radio Access Technology (RAT) transceiver 1654 and a second RAT transceiver 1658. As shown in FIG. 16, and described in greater detail herein, the RAT transceivers '1' 1654 and '2' 1658 are in turn coupled to a multi-RAT communications subsystem 1650 by an Inter-RAT Supervisory Layer Module 1652. In turn, the multi-RAT communications subsystem 1650 is operably coupled to the Bus 1618. Optionally, the respective radio protocol layers of the first Radio Access Technology (RAT) transceiver 1654 and the second RAT transceiver 1658 are operably coupled to one another through an Inter-RAT eXchange Function (IRXF) Module 1656.

In various embodiments, the network node (e.g. 1524) acting as a server comprises a first communication link corresponding to data to/from the first RAT and a second communication link corresponding to data to/from the second RAT.

In addition, the DSP 1602 and the M-LMS positioning module (152, FIG. 1) may be coupled to various microelectromechanical system (MEMS) sensors (not shown) which may include and accelerometer, a gyroscope, a barometer, and an electronic compass, among others.

Figure 17:
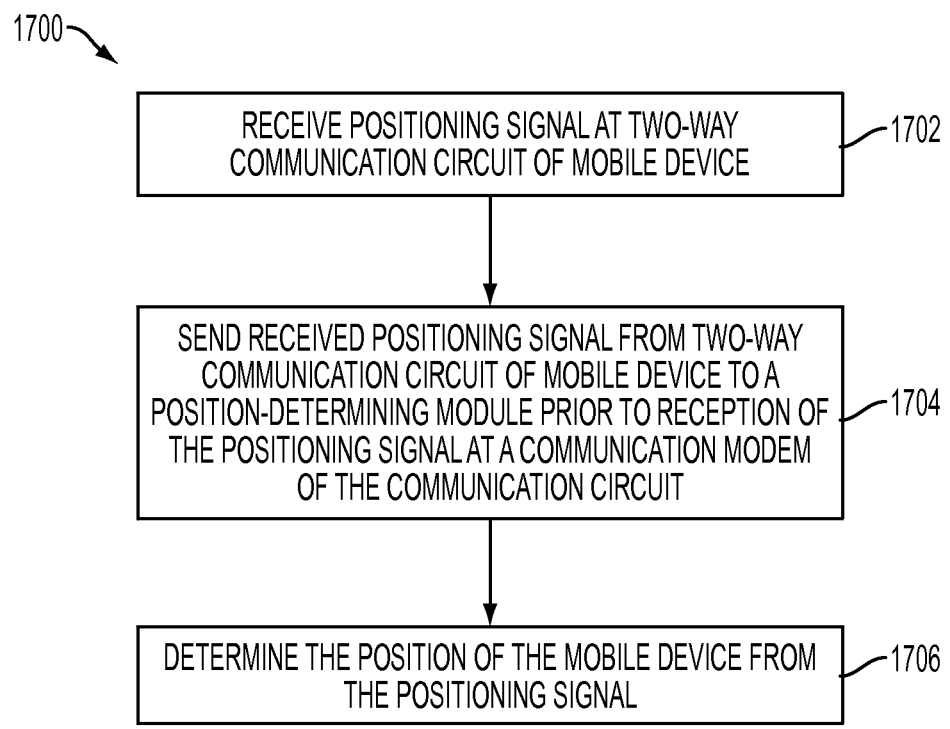
FIG. 17 shows a flowchart illustrating a method of determining a position of a mobile device according to one embodiment.

FIG. 17 shows a flowchart 1700 illustrating a method of determining a position of a mobile device according to one embodiment. In Block 1702, a positioning signal is received at a two-way communication circuit of the mobile device. In Block 1704, the received positioning signal is sent from the two-way communication circuit of the mobile device to a position-determining module prior to the positioning signal being received at a communication modem of the communication circuit. In block 1706, the position of the mobile device is determined from the positioning signal at the position-determining module.

Figure 18:
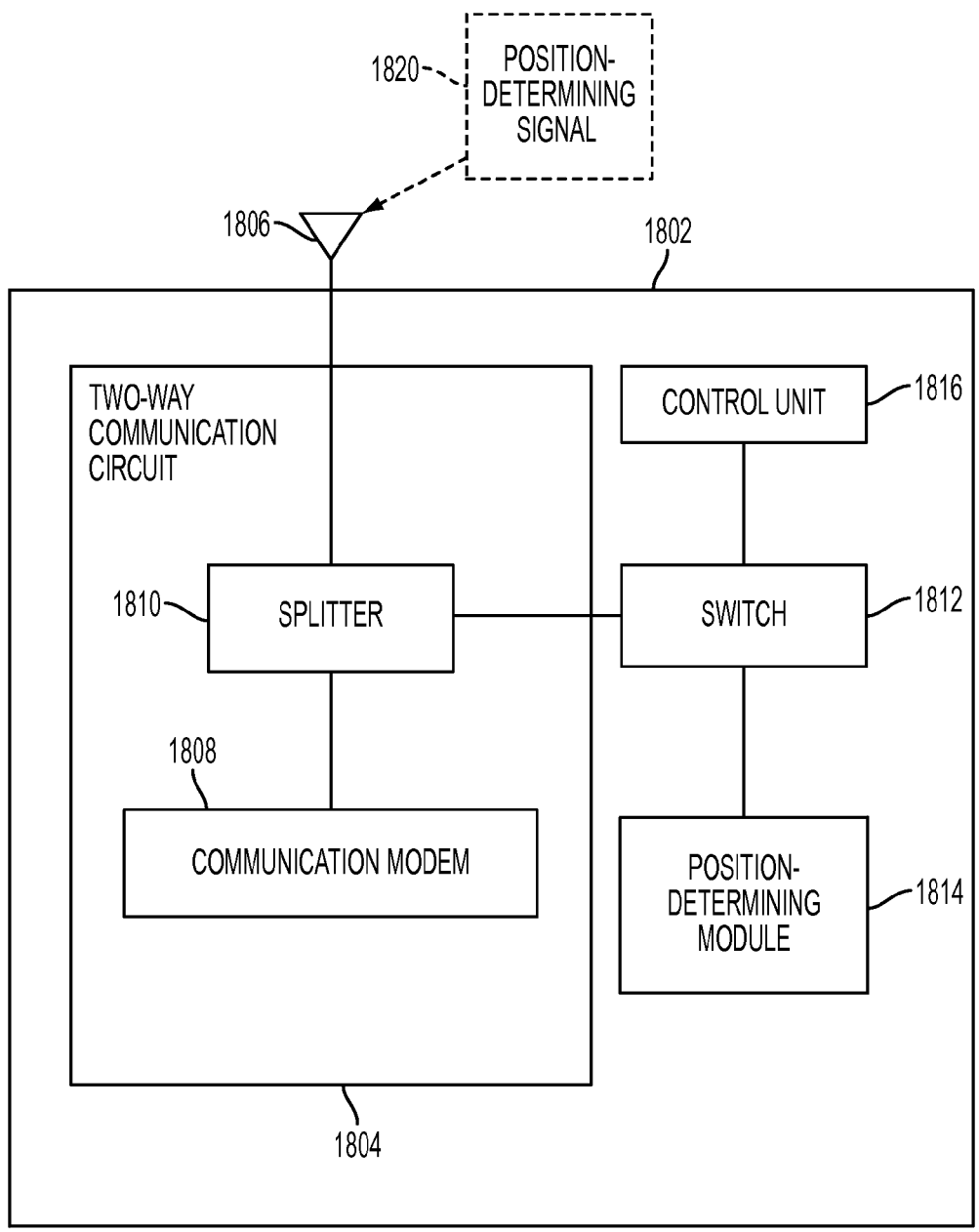
FIG. 18 shows a mobile device that includes circuitry for determining a position of the mobile device according to one embodiment.

FIG. 18 shows a mobile device 1802 that includes the circuitry for determining a position of the mobile device according to one embodiment. The mobile device 1802 includes a two-way communication circuit 1804 that includes an antenna 1806 and a communication modem 1808 that in one aspect receives communication signals from the antenna 1806. A splitter 1810 is along a path between the antenna 1806 and the communication modem 1808. The splitter 1810 splits a positioning signal 1820 received at the antenna 1806 prior to the positioning signal 1820 being received at the communication modem 1808. The split positioning signal 1820 is directed from the splitter 1810 to a position-determining module 1814. A switch 1812 may selectively electrically couple the position-determining module 1814 to the splitter 1810 to send the positioning signal 1820 from the splitter 1810 to the position-determining module 1814. A control unit 1816 may control the switch 1812 to electrically couple and decouple the position-determining module 1814 and the splitter 1810.

Therefore, in one aspect of the present disclosure, a method determining a position of a mobile device includes: receiving a positioning signal at a two-way communication circuit of the mobile device; and sending the received positioning signal from the two-way communication circuit, prior to a modem of the two-way communication circuit, to a position-determining module of the mobile device to determine the position of the mobile device from the positioning signal In another aspect of the present disclosure, a circuit for determining a position of a mobile communication device includes: a two-way communication circuit including an antenna and a communication modem; a splitter configured to split a positioning signal received at the antenna prior to the positioning signal being received at the communication modem; a position-determining module configured to determine the position of the mobile device using the split positioning signal; and a switch configured to selectively electrically couple the position-determining module to the two-way wireless communication circuit at the splitter to send the split positioning signal to the position-determining module.

In another aspect of the present disclosure, a mobile communication device includes: a two-way wireless communication circuit including an antenna and a communication modem; a splitter configured to split a positioning signal received at the antenna prior to the positioning signal being received at the communication modem; a position-determining module configured to determine a position of the mobile device using the split positioning signal; and a switch configured to electrically couple the position-determining module to the splitter to direct the split positioning signal the position-determining module.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of determining a position of a mobile device, the method comprising:
    receiving a positioning signal at a circuit of the mobile device, wherein the circuit is configured for wireless two-way communication; and
    sending the received positioning signal from the circuit, prior to a communication modem of the circuit, to a multilateration location and monitoring service (M-LMS) module of the mobile device via a switch that selectively couples the circuit to the M-LMS module to determine the position of the mobile device from the positioning signal.

2. The method of claim 1, wherein the switch selectively couples the circuit to the M-LMS module prior to the communication modem.

3. The method of claim 2, further comprising controlling the switch using a control signal.

4. The method of claim 1, further comprising sending the positioning signal to the M-LMS module directly from an antenna of the circuit.

5. The method of claim 1, further comprising sending the positioning signal to the M-LMS module from a frequency channel at a back end of a switchplexer module receiving the positioning signal from an antenna of the circuit, wherein a frequency band of the frequency channel corresponds to a frequency band of the positioning signal.

6. The method of claim 1, wherein the circuit further includes an antenna that is at least one of a primary antenna and a diversity antenna.

7. The method of claim 1, wherein the positioning signal is a signal within a frequency band from about 902 Megahertz (MHz) to about 928 MHz.

8. A circuit for determining a position of a mobile communication device, comprising:
    a communication circuit including an antenna and a communication modem, wherein the communication circuit is configured for wireless two-way communication;
    a splitter configured to split a positioning signal received at the antenna prior to the positioning signal being received at the communication modem;
    a multilateration location and monitoring service (M-LMS) module configured to determine the position of the mobile device using the split positioning signal; and
    a switch configured to selectively electrically couple the M-LMS module to the communication circuit at the splitter to send the split positioning signal to the M-LMS module.

9. The circuit of claim 8, further comprising a control unit configured to enable the switch to electrically couple the M-LMS module to the communication circuit.

10. The circuit of claim 9, wherein the control unit is further configured to disable the switch and place the M-LMS module in an idle state.

11. The circuit of claim 8, wherein the switch is selectively electrically coupled directly to the antenna.

12. The circuit of claim 8, wherein the switch is selectively electrically coupled to a frequency channel at a back end of a switchplexer module that receives the positioning signals from the antenna, wherein a frequency band of the channel corresponds to a frequency band of the positioning signal.

13. The circuit of claim 8, wherein the antenna further comprises at least one of a primary antenna and a diversity antenna.

14. The circuit of claim 8, wherein the positioning signal is within a frequency band between about 902 Megahertz (MHz) and 928 MHz.

15. A mobile communication device, comprising:
    a circuit including an antenna and a communication modem, wherein the circuit is configured for wireless two-way communication;
    a splitter configured to split a positioning signal received at the antenna prior to the positioning signal being received at the communication modem;
    a multilateration location and monitoring service (M-LMS) module configured to determine a position of the mobile device using the split positioning signal; and
    a switch configured to electrically couple the M-LMS module to the splitter to direct the split positioning signal to the M-LMS module.

16. The mobile communication device of claim 15, further comprising a control unit configured to enable the switch to electrically couple the M-LMS module to the circuit.

17. The mobile communication device of claim 16, wherein the control unit is further configured to disable the switch and place the M-LMS module in an idle state.

18. The mobile communication device of claim 15, wherein the switch is selectively electrically coupled directly to an antenna of the circuit.

19. The mobile communication device of claim 15, wherein the switch is selectively electrically coupled to a frequency channel of a switchplexer module that receives a signal from an antenna of the circuit, wherein a frequency band of the frequency channel corresponds to a frequency band of the positioning signal.

20. The mobile communication device of claim 15, wherein the positioning signal is within a frequency band between about 902 Megahertz (MHz) and 928 MHz.

21. The mobile communication device of claim 15, further comprising a signal amplifier configured to amplify the split positioning signal to compensate for a splitter loss at the splitter.

* * * * *